April 17, 1962 R. J. RAU 3,029,922
HIGH SPEED KICK-OUT DEVICE
Filed April 2, 1959 2 Sheets-Sheet 1

INVENTOR.
ROBERT J. RAU
BY Bosworth, Sessions,
Hergstrom & Knowles
ATTORNEYS.

April 17, 1962    R. J. RAU    3,029,922
HIGH SPEED KICK-OUT DEVICE
Filed April 2, 1959    2 Sheets-Sheet 2

INVENTOR.
ROBERT J. RAU
BY Bosworth, Sessions,
Herreshoff & Knowles
ATTORNEYS.

United States Patent Office 3,029,922
Patented Apr. 17, 1962

3,029,922
HIGH SPEED KICK-OUT DEVICE
Robert J. Rau, Pittsburgh, Pa., assignor to Blaw-Knox Company, Pittsburgh, Pa., a corporation of Delaware
Filed Apr. 2, 1959, Ser. No. 803,713
4 Claims. (Cl. 198—24)

This invention relates to high speed kick-out apparatus for delivering elongated articles to a conveyor or other receiving means, and more particularly to an improved high speed kick-out adapted to receive lengths of welded pipe or the like traveling at high speed in the direction of their length, decelerate these lengths of pipe to zero velocity, and discharge them transversely of their lengths onto a cooling bed or table.

In the manufacture of butt-weld pipe, skelp in a continuous length is moved through a furnace and then through forming and welding means where it is formed and welded into pipe. The speed of travel of the pipe may be 1,000 feet per minute or more, as it emerges from the welding means, and while moving at this high speed, it is cut into lengths by a flying saw or other suitable apparatus. The lengths of hot pipe are now moving at high speed in longitudinal direction, and it is desired to stop their longitudinal movement and transfer them, one at a time and in spaced relation, to a cooling bed or table whereon the pipes are moved in a direction transversely of their lengths while suitably supported. I have illustrated herein a cooling bed of the screw conveyor type although other forms of cooling beds may be used in conjunction with my improved kick-out apparatus.

As noted above, in modern pipe mills the pipe as it comes from the welding mill is cut into commercial lengths, for example twenty to forty feet, by a flying saw or suitable shearing apparatus. In order to separate the cut lengths of pipe they are discharged onto a conveyor having rolls that are adapted to accelerate the pipe to a speed somewhat higher than that at which it leaves the welding mill. By this means the ends of succeeding lengths of pipe are spaced apart a distance sufficient to permit the pipes to be removed from the conveyor in a direction transversely of their length and deposited on a cooling bed or table incorporating means for moving the pipes thereover. As the lengths of pipes leave the mill, they are moving longitudinally at a very high rate of speed, and it is necessary to decelerate this longitudinal movement to zero before they are deposited on the cooling bed. This is normally accomplished by permitting the pipes to skid along a trough or other surface, the frictional engagement therewith causing the pipes to slow down and stop.

In addition to use for transferring butt-weld pipe from the run-out table of a welding mill to a cooling bed, my improved apparatus is also adapted to transfer cut lengths of pipe as they are discharged from a sizing mill to a cooling bed. Furthermore, it will be understood that my improved kick-out apparatus is readily adaptable for use with numerous types of elongated products other than pipe, such as bars, rods, shapes, etc.

It is among the objects of my invention to provide an improved high speed kick-out apparatus whereby relatively short lengths of elongated articles may be handled while traveling longitudinally at high speed, thus reducing the width of the cooling bed to a minimum; the provision of improved high speed kick-out means which is adapted to operate successfully with only short spaces or gaps between the trailing end of one article and the leading end of the following article; the provision of kick-out means wherein elongated articles may be supported throughout substantially their entire length during the deceleration and transverse transfer operations, thus preventing damage to the articles and insuring proper delivery to the cooling bed; and the provision of a rugged high speed kick-out apparatus which may be economically manufactured and operated and which requires a minimum of maintenance and care.

The above and other objects of my invention will appear from the following description of one embodiment thereof, reference being had to the accompanying drawings in which.

Figure 1:
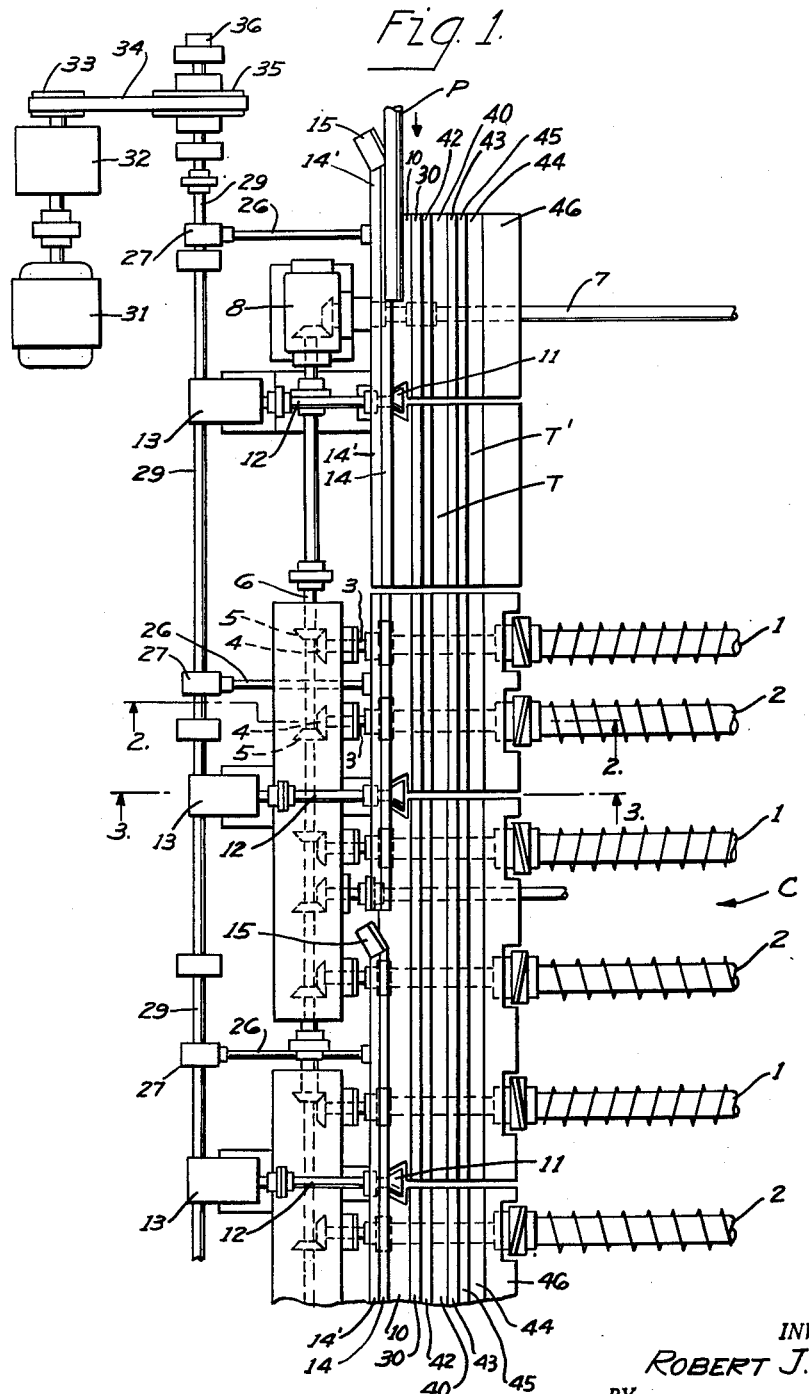
FIGURE 1 is a diagrammatic plan view of my improved kick-out apparatus, a portion of a conveyor screw type cooling bed being illustrated in conjunction therewith.

In FIGURE 1 of the drawings a transverse conveyor in the form of a cooling bed or table of the rotating screw type is generally indicated at C. This conveyor comprises a plurality of pairs of oppositely threaded and oppositely rotating elongated screw members 1 and 2 supported in suitable bearings and having drive shafts 3 projecting from their loading (lefthand in FIGURE 1) ends. These shafts 3 carry bevel gears 4 which mesh with and are driven by bevel gears 5 mounted on and rotatable with the conveyor drive shaft 6. The power means for driving the screws 1 and 2 is not shown but may be an electric motor or the like connected to the shaft 7 which in turn is connected to drive shaft 6 through gear box 8.

In the operation of the cooling bed C the screws 1 and 2 are rotated continuously, and when a length of pipe, or other elongated article, is deposited on the entering end thereof, it will be picked up by the threads on the screws and moved across the bed in a direction transverse of the length of the article. This type of cooling bed is well-known and, per se, forms no part of the present invention. Accordingly it will be understood that other types of transverse conveyors, adapted to receive elongated articles and move them across a bed or table in a direction transverse of the length of the articles, may be employed.

As previously noted, I have herein illustrated my invention in a form particularly adapted to receive pipes from a sizing mill. In FIGURE 1 the forward end of a pipe P is illustrated, and it may be assumed that this pipe is leaving a sizing mill and traveling in the direction of its length as indicated by the arrow. The pipes P that leave the sizing mill are directed onto a first or longitudinal conveyor which consists of a trough-like structure having an inclined fixed guide wall 10 extending lengthwise of the conveyor trough and disposed on the side thereof toward a second or transverse conveyor of the cooling bed C. Driven rollers 11 are carried by shafts 12 and, as clearly seen in FIGURE 3, have their tube supporting faces inclined to correspond to the upward inclination of the guide wall 10 of the longitudinal conveyor structure. Furthermore, as also seen in FIGURE 3, the rollers 11 project slightly above the surface of the adjacent guide wall 10 and extend up through apertures therein so that the pipes P that move onto the longitudinal conveyor from the mill are engaged by the rollers 11 and advanced in the direction of their length at the desired rate of speed.

It will be understood that when my improved kick-out apparatus is used in conjunction with a welding mill and flying hot saw, as distinguished from the above referred to use with a sizing mill, the speed of the rollers 11 may be adjusted to accelerate the lengths of pipe that are cut off by the saw and thus provide the desired spacing or gap between the adjacent ends of succeeding pipes. When used in connection with a sizing mill or the like which handles pre-cut lengths of pipe, the proper spacing between succeeding lengths may be established by the space between the lengths as they are fed into the mill. In such cases the speed of the rolls 11 need be only sufficient to maintain the spacing of the pipes, but they may be used to increase the spacing if desired. Each of the shafts 12 is connected to a separate motor 13 and by this arrangement the proper speed of each of the rolls 11 may be accurately set and maintained.

The pipes P, as they emerge from the mill, are supported not only by the guide wall 10 and the rollers 11 but also by movable wall portions 14 which are oppositely inclined to the wall 10 and form the other side of the pipe receiving trough of the longitudinal conveyor. As illustrated the movable wall portions 14 extend substantially at right angles to guide wall 10. In the illustrated embodiment the wall portions 14 comprise one side of angle elements the other sides of which are indicated at 14'. In FIGURE 1 two of the movable wall portions 14 are illustrated, each of which has an outwardly flaring portion 15 at its entering end to assist in guiding the pipes P onto the trough of the longitudinal conveyor. It will be understood that more or fewer of the movable wall members may be employed depending on the length of the articles to be handled.

Figure 2:
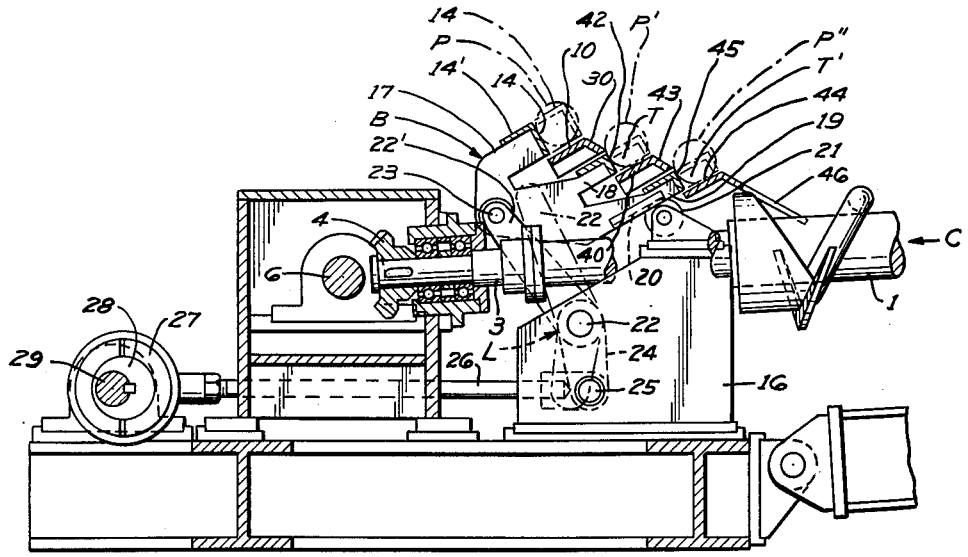
FIGURE 2 is a vertical cross-sectional view taken substantially on line 2—2 of FIGURE 1.
Figure 3:
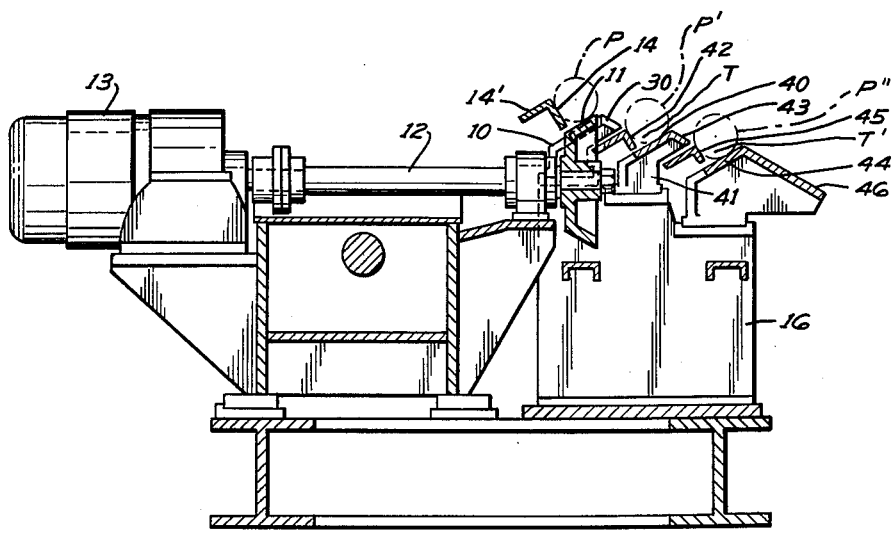
FIGURE 3 is a vertical cross-sectional view taken substantially on line 3—3 of FIGURE 1.

As seen in FIGURE 3, the fixed guide wall 10 of the longitudinal conveyor is supported on a base or frame 16. The movable walls 14 of the longitudinal conveyor unit are mounted on movable bracket members, generally indicated at B in FIGURE 2, which bracket members are supported for movement transversely of the trough formed by walls 10 and 14 and in a direction generally parallel to the slope or inclination of the stationary wall 10. Bracket B has a first movable wall supporting arm 17 on which the movable wall portions 14 are mounted, a second movable wall supporting arm 18 spaced from and extending parallel to arm 17, and a third movable wall supporting arm 19 spaced from and extending parallel to arm 18. The function of arms 18 and 19 will be later described, but it is here pointed out that the underside of arm 19 has a grooved trackway 20 therein adapted to ride on a freely rotatable support roller 21 mounted on the base 16.

A bell crank lever L is pivotally supported on base 16 at 22, and the upper end portion 22' of lever L is pivotally secured to the bracket B at 23 while the lower portion 24 of lever L is pivotally connected at 25 to a connecting rod 26. The outer end of connecting rod 26 carries a sleeve or bushing 27 within which rotates an eccentric 28 that is keyed to the kick-out drive shaft 29.

In FIGURE 2, the movable wall carrying bracket B and the movable wall portions 14 are shown in full lines in their retracted or article-receiving position while they are indicated in phantom lines in their advanced or article-ejecting positions. Starting from the retracted positions shown in full lines, rotation of the shaft 29 and eccentric 28 through 180° will cause the movable wall 14 to move in an upwardly inclined direction toward the transverse conveyor C into ejecting position (phantom lines in FIGURE 2) where movable wall 14 substantially overlies the upper edge of fixed wall 10. Such inclined upward movement of wall 14 is effected by the guiding support given to the bracket B by the rollers 21 and the swinging movement of the upper end 22' of bell crank L. Further 180° rotation of shaft 29 and eccentric 28 will retract wall portion 14 back into its original article-receiving position (full lines in FIGURE 2).

From the above it will be observed that if a pipe P is disposed on the longitudinal conveyor, supported on the stationary wall 10, the rollers 11 and the movable walls 14, and the wall portions 14 are moved transversely of the length of the pipe into ejecting position, such movement will push the pipe up over the inclined fixed wall 10 to the top edge thereof where it may roll down over the downwardly inclined apron 30 which extends from the upper edge of fixed wall 10 downwardly toward transverse conveyor C.

As previously noted, FIGURE 1 illustrates two movable wall portions or sections 14. Each of these is mounted on two brackets B that are disposed intermediate the ends of the wall portion 14. Each bracket B is operatively connected to a bell crank L and through a connecting rod 26 to an eccentric bushing 27. As the eccentrics 29 for each bushing 27 are axially aligned, rotation of the shaft 29 through 360° will cause each of the brackets B to which one wall section 14 is attached to move simultaneously from article-receiving to article-ejecting position and back to article-receiving position.

As previously mentioned, the pipes P are fed to the longitudinal conveyor from the finishing mill or other apparatus in end-to-end relation. When the trailing end of one pipe P reaches the entering end of the longitudinal conveyor, substantially at the flared end 15 of the first movable wall portion 14 thereof, the advancing end of the next pipe P is spaced a certain distance behind. This distance depends upon the spacing of the cut lengths of pipe as they were fed to the finishing mill or, if my apparatus follows a flying saw or the like, the space that has been established between lengths due to the acceleration of the leading pipe P on the longitudinal conveyor by the rolls 11. In any event the kick-out apparatus must operate to kick one pipe out of the trough 10—12 of the longitudinal conveyor and return to article-receiving position before the advancing end of the next pipe reaches the entering portion of the conveyor. This kick-out operation is effected, as has been previously described, by a 360° rotation of the kick-out drive shaft 29. Suitable apparatus is provided for effecting and timing these 360°, single revolution, rotations of shaft 29 and includes a continuously operating motor 31 connected through a gear box 32 to a pulley 33 from which a belt 34 extends to a combination clutch and brake unit 35 which, when the clutch is engaged is adapted operatively to connect shaft 29 to the motor 31 and effect rotation thereof. By means of a suitable rotary limit switch indicated at 36, the clutch, after being engaged, is disengaged and the brake applied so that rotation of the shaft 29 stops after 360° of movement.

Operation of the single rotation drive mechanism is repeatedly instigated at the proper times as by a trip switch (not shown) engaged by the forward end of each pipe P when it reaches a point on the longitudinal conveyor. Thus, as the succeeding pipes P are fed into the trough of the longitudinal conveyor, they are quickly kicked out by operation of the movable wall portions 14 and these kick-out walls are returned to article-receiving position before the advancing end of the next pipe enters the conveyor. By means of the bell crank support and rotatable eccentric drive therefor, the kick-out cycle of the movable walls 14 is completed very rapidly, and the walls returned to article-receiving position before the next pipe reaches the conveyor even though the pipes are moving at high speed and are separated by only relatively short distances.

The pipes P which enter the longitudinal conveyor trough 10—14 travel therethrough at a high rate of speed, and it is necessary that they be decelerated and brought to a stop before they are moved transversely of their length onto the conveyor screws 1 and 2 of the cooling bed C. It is a common procedure to stop the longitudinal movement of pipe lengths or the like by permitting them to slide or skid in a trough, the friction between the trough and the pipe bringing the pipe to a stop. The length of time that it takes to stop a given length of pipe traveling at a given speed depends on the friction between the pipe and the trough. In prior kick-out apparatus a single skid trough has been provided between the longitudinal conveyor and the transverse conveyor or cooling bed. In order to allow enough time for a bar in the skid trough to stop and be transferred to the cooling bed before the next succeeding bar is kicked into the skid trough from the longitudinal conveyor, the articles have been delivered in relatively long lengths. These long lengths require a correspondingly long cooling bed with resultant comparatively high cost. In my improved apparatus a plurality of skid troughs may be conveniently provided whereby shorter lengths of pipe or other articles may be handled, the arrangement being such that lengths of pipe may be skidding in two or more troughs at the same time and the kick-out apparatus will operate on at least some of the articles while they are still skidding. By enabling shorter lengths of articles to be handled and still brought to a stop without overlap or interference with each other, a corresponding shorter cooling bed may be employed with substantial reduction in both first and operating costs.

To accomplish the results described above I provide a plurality of skid troughs disposed parallel to the longitudinal conveyor 10—14 and to each other and disposed between the longitudinal conveyor and the receiving ends of the conveyor screws 1 and 2 of the cooling bed C. These skid troughs are indicated at T and T' on the drawing and, in FIGURES 2 and 3, a pipe P' is indicated in phantom lines as being disposed in trough T and a pipe P'' is indicated in phantom lines as being disposed in skid trough T'.

The first skid trough T is disposed next to the longitudinal conveyor and is adapted to receive pipes that are kicked out of the conveyor trough by the movable wall portions 14. Trough T includes an upwardly inclined fixed wall 40 mounted on brackets 41 (FIGURE 3) that are in turn supported on the base structure 16. The other side of the trough T is formed by movable wall portions 42 that are carried on the wall support arms 18 of the swinging bracket B. At the upper edge of fixed wall 40 is an inclined apron 43 that extends downwardly toward, and guides the pipes into, the second skid trough T'. Fixed wall 44 of trough T' is inclined upwardly and extends parallel to the fixed walls 10 and 40 while the other side of trough T' is formed by the movable wall portions 45. As seen in FIGURE 2, the movable wall portions 45 are carried by the support arms 19 of the brackets B and accordingly are actuated with the movable walls 14 and 42. An elongated apron 46 slopes downwardly from the upper edge of fixed wall 44 and serves as a guide to convey the pipes that are kicked out of the second skid trough T' to the conveyor screws 1 and 2 of the cooling bed C.

In FIGURES 2 and 3 pipes P, P' and P'' are indicated as disposed respectively in the conveyor trough 10—12, first skid trough T and second skid trough T'. Upon rotation of the kick-out shaft 29 through 180° from the position shown in FIGURE 2, the movable walls 14, 42 and 45 will travel toward the cooling bed C, in a direction generally parallel to the slope of the fixed wall portions 10, 40 and 44, until the movable walls substantially overlie the upper ends of the fixed walls. This movement will eject or "kick-out" the pipes that are in the respective troughs, and the pipe P will be transferred from the longitudinal conveyor to the trough T, the pipe P' will be transferred from the first skid trough T to the second skid trough T', and the pipe P'' will be transferred from the second skid trough T' to the screw conveyors 1 and 2 which, as they rotate continuously, will immediately pick up this pipe and move it over the cooling bed C in a direction transversely of the length of the pipe.

As soon as the pipes have been ejected from the troughs, the movable walls 14, 42 and 45 will be retracted and returned to their article-receiving positions seen in FIGURE 2. This occurs during the second 180° of rotation of the shaft 29 and, as previously explained, the shaft then stops and remains stationary until the kick-out apparatus is again set in operation as by engagement of the leading end of the next oncoming pipe with a suitable trip switch as it travels on the longitudinal conveyor.

In the operation of my apparatus the pipes P and P' disposed on the longitudinal conveyor and in the first skid trough may be traveling longitudinally during the kick-out operation. However, the lengths of the troughs are so designed and correlated with the length of the articles being handled that the pipe P'' in the second skid trough T has come to a stop by the time the kick-out stroke of the bracket B and the movable wall portions occurs. Thus the pipes are discharged to the cooling bed C without a longitudinal component of movement and will be properly and accurately disposed on the bed.

The apparatus illustrated herein includes two skid troughs T and T'. It will be understood, however, that in some instances a single skid trough may be sufficient to stop longitudinal movement of the elongated article within the time available while in other instances more than two skid troughs may be required. Also, in the apparatus shown in the drawings the movable wall portions 14, 42 and 45 of the several trough structures form one entire side of their respective trough units. In some instances it may be desirable to make the movable wall portions shorter and provide fixed wall sections between the relatively short movable wall portions. It is preferred, however, that the movable wall portions be of substantial length so that they will contact the pipes over a considerable extent, thus eliminating any tendency to bend or distort the pipes during the kick-out operation. Furthermore, other modifications may be made in the specific form and arrangement of my improved high speed kick-out apparatus without departing from the spirit of my invention. I do not, therefore, wish to be limited to the exact structures herein illustrated and described but claim as my invention all embodiments thereof coming within the scope of the appended claims.

I claim:

1. In apparatus for stopping the longitudinal movement of a series of elongated articles traveling in longitudinal direction on a first conveyor and transferring them in a direction transverse of their lengths to a second conveyor on which said articles are moved in a direction transversely of their lengths, a plurality of skid troughs extending parallel to each other and to said first conveyor and adjacent and between said first and second conveyors, each of said skid troughs having an inclined fixed wall forming the side of the trough toward said second conveyor and an oppositely inclined movable wall portion on the side of the trough away from said second conveyor, means for supporting said movable wall portions for simultaneous movement transversely of said troughs between article-receiving positions and article-ejecting positions whereby elongated articles in said troughs may be simultaneously moved over the upper edges of the fixed walls of said troughs, means for simultaneously moving said movable wall portions from article-receiving to article-ejecting position and return, said second conveyor being disposed to receive articles ejected from the skid trough next adjacent thereto.

2. In combination in apparatus of the type described, a first conveyor for conveying successive elongated articles in a longitudinal direction, a second conveyor for moving said articles in a direction transverse of their lengths, and means for stopping longitudinal movement of said articles and transferring them from said first conveyor to said second conveyor including a first skid trough extending parallel and adjacent to said first conveyor, said trough being generally V-shaped in transverse cross-section and having an inclined fixed wall forming the side of the trough toward said second conveyor and an oppositely inclined movable wall forming the side of the trough away from said second conveyor, means for supporting said movable wall for movement transversely of said trough between an article-receiving position and an article-ejecting position whereby an elongated article in said trough may be moved over the upper edge of said fixed wall of said trough, a second skid trough of generally V-shaped transverse cross-section extending parallel to and adjacent said first skid trough, said second trough being disposed between said first trough and said second conveyor and having an inclined fixed wall forming the side of the second trough toward said second conveyor and an oppositely inclined movable wall forming the side of said second trough adjacent said first trough, means for supporting said second trough movable wall for movement transversely of said second trough between an article receiving position and an article-ejecting position simultaneously with corresponding movement of said movable wall of said first trough, means for simultaneously moving said movable walls of said first and second troughs from article-receiving to article-ejecting positions and return, said second conveyor being disposed to receive articles ejected from said second skid trough by said second trough movable wall.

3. In combination in apparatus of the type described a first conveyor for conveying successive elongated articles in a longitudinal direction, a second conveyor adjacent said first conveyor for moving said articles in a direction transverse of their lengths, said first conveyor including an inclined fixed guide wall extending lengthwise thereof on the side toward said second conveyor and an oppositely inclined movable wall portion, a plurality of skid troughs extending parallel to each other and to said first conveyor and adjacent and between said first and second conveyors, each of said skid troughs having an inclined fixed wall forming the side of the trough toward said second conveyor and an oppositely inclined movable wall portion on the side of the skid trough away from said second conveyor, a plurality of longitudinally spaced common brackets for supporting said movable wall portions of said first conveyor and said skid troughs for simultaneous movement between article-receiving positions and article-ejecting positions whereby elongated articles on said first conveyor and in said skid troughs may be simultaneously moved transversely over the upper edges of said fixed walls, a base structure, a plurality of lever means pivotally mounted on said base structure and pivotally connected one to each of said brackets, connecting rod means pivotally secured to each of said lever means, and means for reciprocating said connecting rod means to move said brackets and said movable wall portions simultaneously from article-receiving to article-ejecting positions and return, said second conveyor being disposed to receive articles ejected from the skid trough next adjacent thereto.

4. In combination in apparatus of the type described, a first conveyor for conveying successive elongated articles in a longitudinal direction, a second conveyor adjacent said first conveyor for moving said articles in a direction transverse of their lengths, said first conveyor including an inclined fixed guide wall extending lengthwise thereof on the side toward said second conveyor and an oppositely inclined movable wall portion, a plurality of skid troughs extending parallel to each other and to said first conveyor and adjacent and between said first and second conveyors, each of said skid troughs having an inclined fixed wall forming the side of the trough toward said second conveyor and an oppositely inclined movable wall portion on the side of the skid trough away from said second conveyor, a plurality of longitudinally spaced common brackets for supporting said movable wall portions of said first conveyor and said skid troughs for simultaneous movement between article-receiving positions and article-ejecting positions whereby elongated articles on said first conveyor and in said skid troughs may be simultaneously moved transversely over the upper edges of said fixed walls, a base structure, a plurality of lever means pivotally mounted on said base structure and pivotally connected one to each of said brackets, connecting rod means pivotally secured to each of said lever means, a rotatable kick-out shaft extending parallel to said fixed walls, means for operatively connecting said connecting rods to said shaft whereby rotation of said shaft will reciprocate said connecting rods and move said brackets and said movable wall portions simultaneously from article-receiving to article-ejecting positions and return, said second conveyor being disposed to receive articles ejected from the skid trough next adjacent thereto, drive means for effecting single revolution rotation of said kick-out shaft, and means, effective when an elongated article reaches a predetermined position on said first conveyor, for actuating said drive means.

References Cited in the file of this patent

UNITED STATES PATENTS

| | | |
|---|---|---|
| 1,929,487 | Feller | Oct. 10, 1933 |

FOREIGN PATENTS

| | | |
|---|---|---|
| 719,431 | Germany | Apr. 9, 1942 |